Dec. 31, 1946.  H. A. HULSBERG  2,413,352
FLOWMETER
Filed March 30, 1944
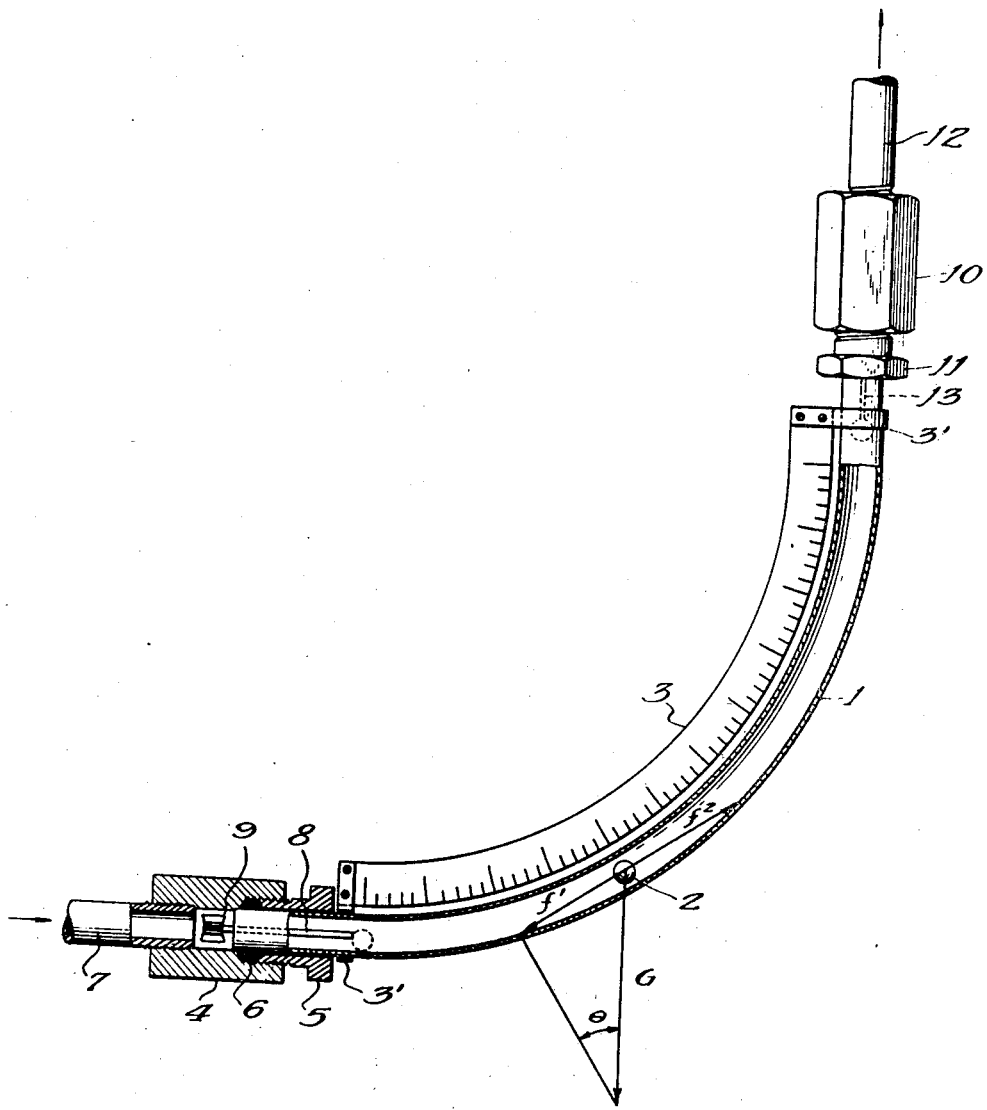
Inventor:
Herbert A. Hulsberg
By Lee J Gary
Attorney Patented Dec. 31, 1946

2,413,352

UNITED STATES PATENT OFFICE 2,413,352

FLOWMETER

Herbert A. Hulsberg, Riverside, Ill., assignor to Universal Oil Products Company, Chicago, Ill., a corporation of Delaware Application March 30, 1944, Serial No. 528,688

6 Claims. (Cl. 73—205)

This invention relates to a flow meter for measuring fluids both liquid and gaseous.

The present invention provides a flow meter which is very easily and economically constructed.

Briefly the apparatus comprises a curved tube of substantially uniform diameter confining a freely movable sphere therein. The tube is bent in the form of a curve disposed so that the angle formed between a tangent to the curve and a horizontal plane increases from one end of the tube to the other. For example, the tube may be bent in the form of a quadrant of a circle with the inlet end horizontal and the outlet end in the vertical plane. Although when the tube is formed in the shape of a quadrant of a circle very satisfactory results may be obtained, it is not intended that the invention be limited to this specific form of apparatus because various other shapes may be found advantageous in different situations.

Other shapes to which the tube may be bent include parabolas and logarithmic curves. Also the tube may be made of transparent material for direct visual observation or of a non-magnetic material.

In order to make the features and advantages of this invention more apparent and clearly understood reference is made to the accompanying drawing which is an elevational view, partly in section, of a preferred form of flow meter constituting the invention.

Referring to the drawing, the main element of the flow meter in this modification is a bent transparent tube designated by the numeral 1. This tube may be composed of any suitable material, such as ordinary glass, Pyrex glass, quartz, etc., the selection being dependent upon the operating conditions of the instrument. Within the tube is confined a spherical shaped member 2, the size and weight of this member being dependent upon the viscosity and density of the material to be measured. Extending parallel with the transparent tube is a graduated scale 3 which is supported from the tube by suitable clamp rings 3' and bolts as shown. The inlet end of the meter is connected to inlet conduit 7 by means of adapter 4. Adapter 4 receives one end of the transparent tubing which is held and sealed in place by means of the packing gland nut 5 and suitable packing 6.

Adapter 4 also is provided with a limit stop 8 which limits the movement of sphere 2 in tube 1 as indicated by the dotted lines. Limit stop 8 is supported in adapter 4 by suitable web-like members 9. The outlet end of the measuring tube is connected by means of adapter 10 and packing nut 11 to outlet conduit 12. Adapter 10 and packing gland nut 11 are similar to adapter 4 and nut 5 and function to provide a substantial seal between tube 1 and conduit 12.

A limit stop 13 is also provided at the outlet end of tube 1. This stop being secured and supported within adapter 10 in a manner similar to that by which limit stop 8 is secured to and supported by adapter 4.

In operation as material is introduced by means of conduit 7 and withdrawn by means of conduit 12, the force of the flowing material will be dependent upon the velocity thereof. This force $f2$ will act upon sphere 2 and displace it toward the outlet end of the measuring tube until the force $f1$ equals force $f2$. Force $f1$ when tube 1 is bent in the form of a quadrant of a circle is equal to $G \sin \theta$. Force $f1$ will increase as angle $\theta$ increases and decrease as angle $\theta$ decreases.

When force $f1$ equals force $f2$ sphere 2 will remain substantially stationary in the tube and by referring to scale 3 a measurement of the flow can be readily ascertained. It is of course necessary to calibrate the instrument for the various types of material to be measured.

I claim as my invention:

1. A flow measuring device which comprises in combination a transparent conduit of substantially uniform cross section, a spherical member freely movable within the conduit and of substantially smaller diameter than the internal diameter of the conduit whereby to permit the flow of fluid between said member and the wall of the conduit, said conduit being formed in the shape of a curve having a constantly increasing slope with respect to a horizontal plane, means for directing fluid to be measured through said conduit in the direction of increasing slope, and a graduated scale disposed parallel and adjacent to said conduit, said spherical member indicating the rate of flow on said scale.

2. The measuring device defined in claim 1 further characterized in that the axis of the inlet end of said conduit is disposed substantially horizontal and the axis of the discharge end of said conduit is disposed substantially vertical.

3. The measuring device defined in claim 1 further characterized in that said conduit is formed in the shape of an arc of a circle.

4. The measuring device defined in claim 1 further characterized in that said conduit is formed in the shape of a parabola.

5. The measuring device defined in claim 1 further characterized in that said conduit is formed in the shape of a logarithmic curve.

6. A flow measuring device which comprises in combination a length of transparent conduit of uniform diameter and shaped in the form of a quadrant of a circle, a spherical member freely movable within the conduit and of substantially smaller diameter than the internal diameter of the conduit whereby to permit the flow of fluid between said member and the wall of the conduit, one end of said transparent conduit being tangent to a horizontal line and the other end thereof being tangent to a vertical line, means comprising an inlet conduit for directing the stream to be measured into that end of said conduit which is tangent to a horizontal line, means comprising an outlet conduit for removing said stream from the other end of said transparent conduit, and a graduated scale disposed parallel and adjacent to said transparent conduit, said spherical member indicating the rate of flow on said scale.

HERBERT A. HULSBERG.